United States Patent [19]
Bergeron, Jr.

[11] Patent Number: 4,663,879
[45] Date of Patent: May 12, 1987

[54] METHOD AND APPARATUS FOR HARVESTING CRAWFISH AND LIKE LIVING THINGS

[76] Inventor: Hervin J. Bergeron, Jr., Rte. 2, Box 224, Opelousas, La. 70570

[21] Appl. No.: 753,647

[22] Filed: Jul. 10, 1985

[51] Int. Cl.$^4$ .............................................. A10K 80/00
[52] U.S. Cl. ........................................ 43/4.5; 43/6.5; 43/9
[58] Field of Search ........................... 43/4.5, 6.5, 4, 9; 119/2; 37/119, 55; 56/8, 9

[56] References Cited

U.S. PATENT DOCUMENTS

| | | | |
|---|---|---|---|
| 314,047 | 3/1885 | Moscopoulos | 43/9 |
| 1,138,541 | 5/1915 | Conekin | 43/6.5 |
| 1,415,113 | 5/1922 | Phillips | 56/9 |
| 1,467,763 | 9/1923 | Lybeck | 43/6.5 |
| 1,486,485 | 3/1924 | Frissell | 43/6.5 |
| 2,672,700 | 3/1954 | Hanks | 43/6.5 |
| 2,684,549 | 7/1954 | Olden | 37/119 |
| 2,744,350 | 5/1956 | Bass | 43/9 |
| 3,131,502 | 5/1964 | Luketa | 43/9 |
| 3,458,947 | 8/1969 | Ross | 43/9 |
| 3,521,386 | 7/1970 | Franklyn | 56/9 |
| 3,786,592 | 1/1974 | Miller | 43/6.5 |
| 4,349,972 | 9/1982 | Bruce | 43/4.5 |
| 4,458,621 | 7/1984 | De Clifford | 43/6.5 |
| 4,520,616 | 6/1985 | Stewart | 56/8 |
| 4,563,830 | 1/1986 | Cain | 43/4.5 |

FOREIGN PATENT DOCUMENTS

| | | | |
|---|---|---|---|
| 1024345 | 1/1978 | Canada | 43/4 |
| 7414095 | 5/1976 | Netherlands | 37/55 |

Primary Examiner—Nicholas P. Godici
Assistant Examiner—Christopher L. McKee
Attorney, Agent, or Firm—John F. Sieberth

[57] ABSTRACT

Described are apparatus and methods for harvesting crawfish from relatively shallow water such as flooded rice fields. Among the principles utilized are the following:

- creating a forwardly moving zone of turbulence in the water to draw the crawfish from the floor of the submerged field upwardly in the water from when they can be captured by means of suitable apparatus;
- establishing in the water a forwardly moving water-permeable zone in which the crawfish are readily captured for transport to a storage area, and forcing water away from behind such zone to create a rearward flow of water into the zone to assist in continuously directing additional crawfish into the zone;
- employing a plurality of underwater jet streams to "tickle" the crawfish located alongside the path being traveled by the crawfish harvester—i.e., to disturb them so that they tend to move into the path of the harvester for capture;
- using as the harvester a wheeled vehicle in which at least some of the wheels are hollow drum-like wheels to reduce the amount by which the underlying ground of the flooded field is compacted by the vehicle during a harvesting operation;
- aerating the water during harvesting operations to enhance the growth of the unharvested crawfish.

39 Claims, 8 Drawing Figures

METHOD AND APPARATUS FOR HARVESTING CRAWFISH AND LIKE LIVING THINGS

TECHNICAL FIELD

This invention relates to harvesting living things from relatively shallow water, such as flooded fields and the like. More particularly this invention pertains to novel apparatus and methods for capturing crawfish in a particularly efficient manner.

BACKGROUND

Among the culinary delicacies for which Southern Louisiana has rightfully gained worldwide recognition and acclaim are the distinctive ways in which crawfish are prepared and served. This relatively small crustacean, also called crayfish, is rapidly gaining favor in other parts of the nation and, indeed, the world. It has recently been estimated that Louisiana alone consumes about 100 million pounds of crawfish per year, and there is every reason to believe that the nationwide demand for this delicacy will continue to grow.

At present there are two principal ways by which the demand for crawfish is fulfilled. One involves use of baited traps into which the crawfish are lured and captured. The other involves growing them under controlled conditions for harvest, a technique often referred to as aquaculture.

Crawfish thrive abundantly in open fields, especially in flooded rice fields. While traps are often used for capturing crawfish in such open fields, a need exists for a more efficient way of harvesting crawfish from relatively shallow water such as flooded rice paddies and the like. This invention is deemed to fulfill this need most efficiently and expeditiously.

THE INVENTION

In accordance with this invention one or more of a number of special principles are utilized in harvesting crawfish and like objects from relatively shallow water, such as flooded rice fields. One such principle involves creating a forwardly moving zone of turbulence in the water so that such objects are drawn upwardly in the water from whence they can be captured by means of suitable apparatus. Under normal circumstances the crawfish tend to remain on the floor of the submerged field. By employing a forwardly moving zone of turbulence not only is the efficiency of the harvesting operation markedly increased, but the condition of the flooded field is not impaired and thus the field remains well suited for other uses such as rice growing.

Another special principle utilized in various embodiments of this invention involves establishing in the water a forwardly moving water-permeable zone in which the crawfish are readily captured for transport to a storage area, and forcing water away from behind such zone to create a rearward flow of water into the zone to assist in continuosly directing additional crawfish into the zone. By use of this principle the efficiency of the harvesting operation is also markedly increased without causing damage to the field itself. Moreover when utilizing this principle in a preferred manner, viz. by forcing water away from behind this zone in the form of sidewardly directed sprays, another decidedly advantageous result is achieved—the water in the spray is aerated, and this is a condition highly favorable to enhanced crawfish growth.

Another special principle utilized in preferred embodiments of this invention is the provision of a land-based wheeled vehicle for effecting the harvesting in relatively shallow water, such as flooded rice fields, in which the wheels comprise hollow rolls or drum-like structures. This enables the vehicle to be driven both on dry land and on shallow flooded land areas, and when driven over flooded rice fields or the like the volumetric displacement of water by the hollow drum-like wheels results in a substantial reduction in vehicular weight. In other words when the vehicle is used in a flooded field, the buoyancy contributed by the hollow drum-like wheels reduces the pressure the vehicle exerts upon the underlying earth and this prevents the formation of deep ruts or other severe damage to the field which would interfere with its normal usage, such as rice growing. Moreover, by utilizing hollow drum-like structures as the rolling support for the vehicle, a substantial area of contact between the vehicle and the underlying ground is maintained, and this still further reduces the pressure exerted by the vehicle per unit area of underwater ground surface—i.e., the weight is distributed over a large area. This in turn lessens still further the amount by which the underlying ground of the flooded field is compacted by the vehicle during a harvesting operation.

Still another special principle utilized in preferred embodiments of this invention is to provide a system that utilizes forwardly moving water-permeable means for capturing crawfish, and a plurality of underwater jet streams to "tickle" the crawfish located alongside the path being traveled by these means—i.e., to disturb them so that they tend to move into the path of the forwardly moving water-permeable means for capture.

Still other advantageous features of this invention will become evident as the description proceeds.

In one of its embodiments this invention provides apparatus for harvesting crawfish or like living objects from relatively shallow water which comprises: (a) a vehicle; (b) conveyor means aligned in the general direction in which the vehicle travels and adapted to carry the captured living objects from a forward position upwardly to a more elevated rearward position; (c) porous means for engaging such objects below the water level and directing them toward said forward position of the conveyor means; and (d) means for thrusting water from behind such forward position to assist in directing the living objects below the water level rearwardly toward the forward position of the conveyor means.

Pursuant to another of its embodiments this invention provides apparatus for harvesting crawfish or like living objects from relatively shallow water which comprises: (a) a vehicle; (b) conveyor means aligned in the general direction in which the vehicle travels and adapted to carry the captured living objects from a forward position upwardly to a more elevated rearward position; (c) porous means for engaging such objects below the water level and directing them toward the forward position of the conveyor means; and (d) means positioned in front of the vehicle in proximity to the lower portion of the porous means for creating turbulence in the water as the vehicle travels forwardly so that such objects are drawn upwardly in the water for capture.

A further embodiment of this invention involves the provision of apparatus for harvesting crawfish or like living objects from relatively shallow water which comprises: (a) a wheeled vehicle; and (b) means mounted on the vehicle for capturing crawfish from under the water; the apparatus being further characterized in that the wheels of the vehicle comprise hollow drum-like wheels to reduce the amount by which the underlying ground of the flooded field is compacted by the vehicle during a harvesting operation.

Yet another embodiment of this invention involves providing apparatus for harvesting crawfish from relatively shallow water which comprises: (a) a vehicle; (b) water-permeable means positioned on the front portion of the vehicle for capturing crawfish; and (c) means for issuing a plurality of underwater water jet streams outwardly and forwardly from the outer ends of the water-permeable means thereby tending to cause such living objects to move into the path in which the vehicle travels.

In still another embodiment, this invention involves a method of harvesting crawfish or like living objects from relatively shallow water which comprises: (a) causing the objects to be moved in the water toward the mouth of a forwardly moving water-permeable zone; (b) causing the objects in such zone to be lifted from the water onto rearwardly moving conveyor means; and (c) forcing water away from behind the zone to create a rearward flow of water into the mouth of the zone to assist in directing the objects toward the mouth of the zone.

In yet another embodiment of this invention there is provided a method of harvesting crawfish or like living objects from relatively shallow water which comprises: (a) creating a forwardly moving zone of turbulence in the water so that such objects are drawn upwardly in the water; (b) causing the objects to be drawn toward the mouth of a water-permeable zone from whence they are transported upwardly from the water by a conveyor system; and (c) forcing water away from behind such zone to create a rearward flow of water into the mouth of the zone to assist in directing the objects toward the mouth of the zone.

These and other embodiments of this invention will become still further apparent from a consideration of the ensuing description, the appended claims, and the accompanying drawings in which:

Referring now to the Figures of the drawings wherein like numerals represent like parts among the various views, vehicle 10 in the form depicted includes prime mover 18 (e.g., a gasoline or diesel engine or an electric motor) and is a self-propelled wheeled vehicle carrying the harvesting equipment. It will be understood of course that vehicle 10 may ride on treads instead of wheels, and that the vehicle need not be self-propelled—it can be propelled (e.g., pushed) by a separate driving vehicle should this be desired. Likewise, vehicle 10 may be in the form of a barge or other water-based vehicle of shallow draft, either self-propelled or propelled by a suitable driving vehicle. And in cases where a separate vehicle is used to effect the propulsion, that vehicle may be land-based or water-based.

Vehicle 10 as depicted includes a seat 11 for the operator and the appropriate controls 13 for operating and steering the vehicle and for actuating the hydraulic cylinder, conveyor belt, turbine, and tickler systems referred to below.

Positioned at the front of vehicle 10 is hinged platform 12 which can be raised to an upright position or lowered to a horizontal position (as shown) by means of hydraulic cylinder 14. Arms 22,22 are pivotally supported at the sides of hinged platform 12. Hydraulic cylinders 23,23 are connected to platform 12 and arms 22,22 and enable the arms to be thrust outwardly (laterally) and forwardly (as shown) or to be moved into a retracted position generally parallel the sides of platform 12. This arrangement enables the arms to be drawn into an upright position which is desirable when transporting the vehicle from place to place. To accomplish this, hydraulic cylinders 23,23 are retracted to draw arms 22,22 inwardly, and hydraulic cylinder 14 is retracted so that platform 12 and arms 22,22 are moved in unison into a upright position.

Figures 3, 4:
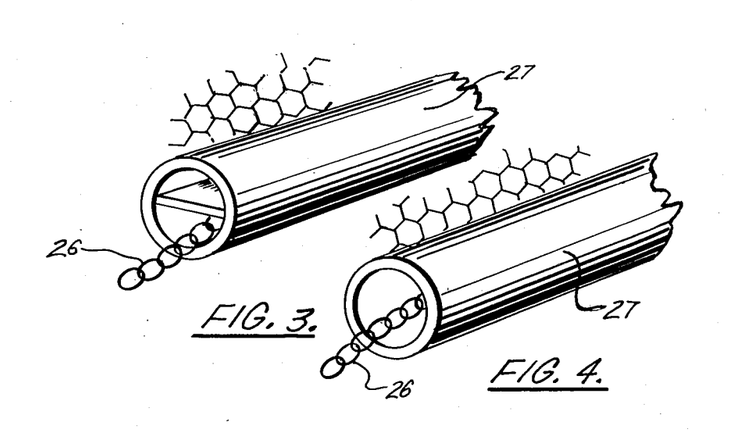
FIG. 3 is a view in perspective of a fragment of one form of preferred means for creating turbulence in the water as the apparatus moves forwardly during use.
FIG. 4 is a view in perspective of a fragment of another form of preferred means for creating turbulence in the water as the apparatus moves forwardly during use.

Connected to the outer ends of each of arms 22,22 is a side support 24 each of which rides on a relatively small wheel 25. In lieu of wheel 25, a skid (not shown) to slide on the underwater ground surface may be used. Attached across the lower portions of supports 24,24 is a drag chain 26 encased along major portions of its length by a flexible oversized tubing 27. Flexible cable, heavy duty rope, or the like may be used in lieu of drag chain 26. As indicated by FIGS. 3 and 4 tubing 27 may be of various cross-sectional configurations, e.g., a hollow cylinder (FIG. 4), a partitioned hollow cylinder (FIG. 3), etc. The size of the interior passage of tubing 27 encasing drag chain 26 or the like may be oversized or just large enough to accommodate drag chain 26 or the like.

In place of wheels 25 or skids at the base of side supports 24,24, a suitably sized float (not shown) may be attached on each support 24 so that these supports and the outer end portions of arms 22,22 are themselves buoyed or partially supported by the water. In this case arms 22,22 may be connected to platform 12 by means of ball joints or the like so that the arms can move upwardly and downwardly in response to waves or other fluctuations in the water level.

As noted above, a feature of this invention is the provision of means for creating sufficient turbulence (e.g., wave fronts, swirling currents, or etc.) in the water to raise the crawfish from the underwater ground surface up into the water to facilitate their capture. In the form of apparatus depicted drag chain 26 and tubing 27 are used to fulfill this objective although it will be understood and appreciated that other systems or arrangements may be employed for this purpose, such as rotating devices, or water or air jets to stir or swirl the water in front of the vehicle. It will be appreciated that the turbulence need not be strong or violent—all that is required is to create enough motion in the water in front of tubing 27 to lift crawfish from the underground surface up into the water so that they can be drawn into the netting or into the flows leading to the open zone 30 referred to hereinafter.

In order to create and maintain an advancing zone of turbulence when using the depicted chain and tubing system for this purpose, tubing 27 should have an outer diameter sufficiently large, e.g., at least 2 and up to about 10 inches or more, preferably about 2 to about 8 inches, and most preferably about 4 to about 6 inches, so that as it is dragged forwardly in the water it creates and maintains the desired advancing zone of turbulence. Another characteristic of tubing 27 is that for best results it should be composed of relatively flexible material (e.g., rubber, flexible plastic, or the like) so that it can undulate as needed to remain generally in contact with the underlying ground surface along a substantial portion of its length as it is dragged forwardly by drag chain 26 or the like. If desired segments of tubing 27 may be sealed off to render the segments air-tight and water-tight so that the buoyancy of the air-filled segments reduces the pressure exerted upon the underlying earth by tubing 27 and encased drag chain 26.

Netting 20 is supported at its top portions by arms 22,22, at its outer side portions by side supports 24,24, and at its lower portions by drag chain 26 and tubing 27, thereby providing a porous system for engaging crawfish below the water level. By positioning the arms and associated netting outwardly and forwardly (as shown), the engaged crawfish or the like are snared and directed toward the median plane of the vehicle.

Netting 20 is sized to permit small debris and undersized crawfish to pass through while retaining the crawfish of the desired size. For example with crawfish of the type generally indigenous to Louisiana, netting with ½ to 1 inch and preferably about ¾ inch openings will usually be found satisfactory for use. It will be appreciated that in lieu of netting, appropriately sized panels of porous screening, apertured plates, or the like may be used.

At the central portion of the netting is an open zone 30 composed of roller 31 and ramp 32 leading to conveyor belt 33. Roller 31 assists in leveling the underwater ground surface and additionally tends to keep the netting from snaring on uneven surfaces. Ramp 32 has sufficient open spaces to permit water and small debris—but not the captured crawfish of desired size—to pass or drop through it. Screening 29 is positioned on both sides of ramp 32 to confine the captured crawfish being moved toward and onto conveyor belt 33. Conveyor belt 33 in the form shown is an upwardly inclined endless belt, the rearward portion of which is elevated above a wire basket or other porous container 34. An opening in the rear wall of basket 34 leads to chute 35 extending from the back end of vehicle 10. Thus crawfish that are drawn into the open zone 30 are guided by ramp 32, screening 29, and the adjacent portions of netting 20 onto the upwardly moving conveyor belt 33. Conveyor belt 33 in turn transports the captured crawfish upwardly toward the back end of the vehicle where they are dropped from the conveyor belt into basket 34 where, if desired, they can be hosed down to remove mud and other debris and passed through chute 35 into a suitable storage vessel or container (not shown) such as, for example, a barge or trailer towed by vehicle 10.

As also noted above, another feature of this invention is the provision of a system which causes an enhanced flow of water to occur into open zone 30, i.e., a flow of water at a rate higher than that caused simply by the forward travel of vehicle 10. In the form depicted this system is composed of a water plow 41 and one or more powered turbines 43 for driving water from the zone under the vehicle behind ramp 32 and between the front wheels 17,17. Water plow 41 functions by creating and maintaining a wave front issuing toward the sides of vehicle 10 as it travels forwardly through the relatively shallow water. This exodus of water creates a condition in which extra water seeking to return to its original level flows inwardly and rearwardly to compensate for the volume of water forced to the sides by the water plow. This enhanced flow assists significantly in directing the crawfish into the open zone 30 and onto conveyor belt 33. In fact, use of water plow 41 as the sole means of enhancing this desired inward and rearward flow is feasible and constitutes an embodiment of this invention.

To achieve an even greater inward and rearward flow for carrying the crawfish into open zone 30 and onto conveyor belt 33, one or a plurality of water turbines 43 are utilized, with or without water plow 41. The water intake(s) for turbine(s) 43 is/are positioned at any suitable location(s) behind open zone 30 and between front wheels 17,17 and the turbines are driven by an appropriate power source associated with vehicle 10 or other driving vehicle. Water output from the turbine(s) is forced to the side(s) and/or rear of the vehicle. Note FIG. 6 which schematically represents one such preferred manner of water flow. While the water driven from the turbine(s) may be forced directly into the adjacent water below the surface at the side(s) of the vehicle and thereby create an outwardly flowing wave of water similar in effect to the waves produced by a water plow 41, it is preferred to cause the output water from the turbine(s) 43 to be sprayed in any suitable direction, most preferably toward the side(s) of vehicle 10. In all such cases the displacement of water from behind open zone 30 causes an enhanced flow of water inwardly and rearwardly into open zone 30 and in so doing, further assists in carrying the crawfish onto or over ramp 32 and onto conveyor 33. Moreover, when using the turbine(s) to spray the water, the water is aerated and, as noted above, aeration of the water is conducive to enhanced growth of crawfish.

Positioned on the lower portions of supports 24,24 are a plurality of water jets 21 which force streams of water outwardly and forwardly, for example at 40 and 45 degree angles, in order to "tickle" the crawfish—i.e., disturb them so that they tend to move inwardly from beyond the extremities of netting 20 into the path of netting 20 and the zone of turbulence created by tubing 27. Preferably jets 21 are fed a portion of the water taken in and pressured by turbine(s) 43 and transmitted by suitable pressure tubing (not shown) carried in or on arms 22,22. However a separate system may be used for supplying water under pressure to jets 21.

Figure 1:
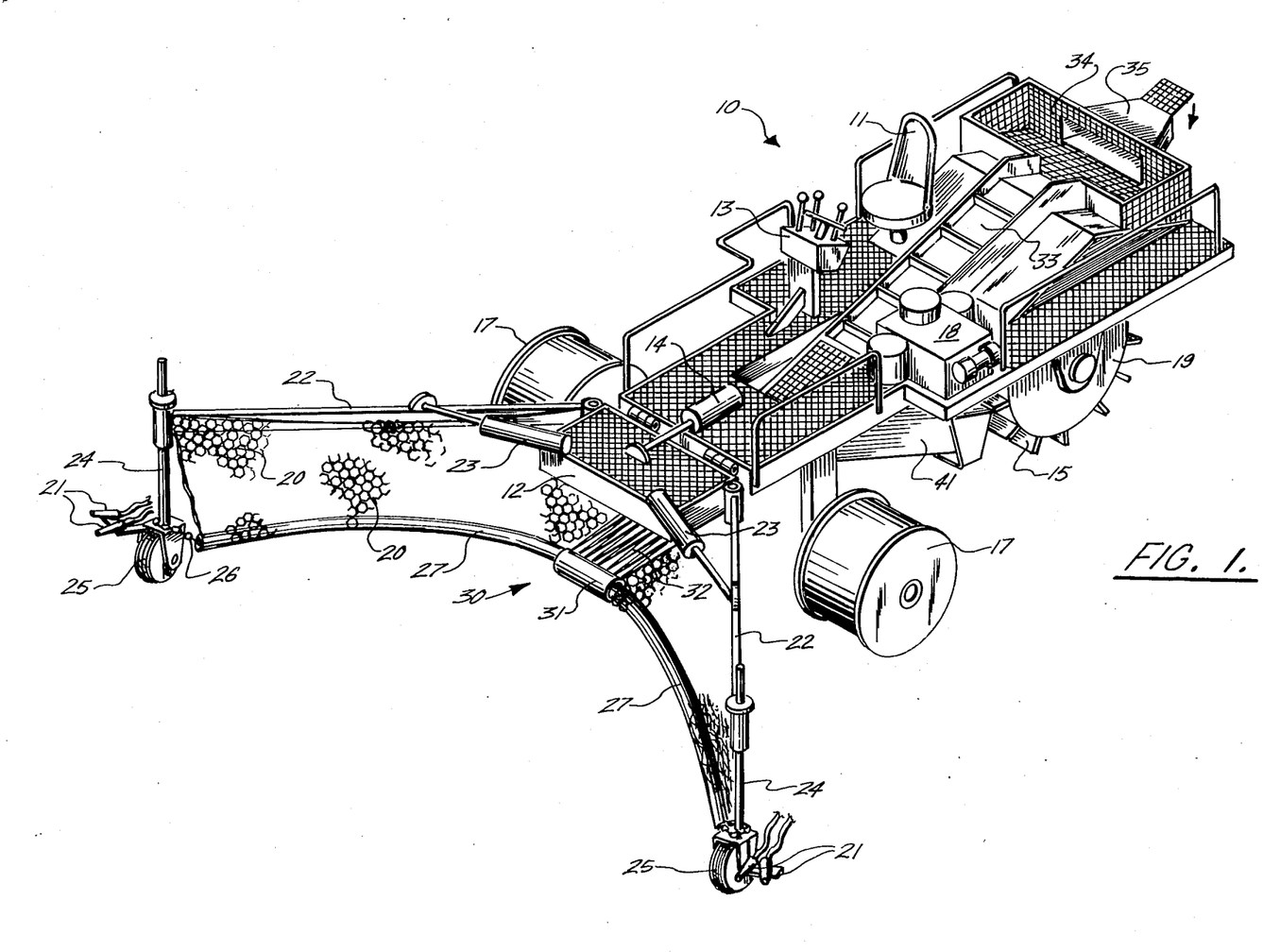
FIG. 1 is a view in perspective of a preferred form of apparatus of this invention.
Figure 2:
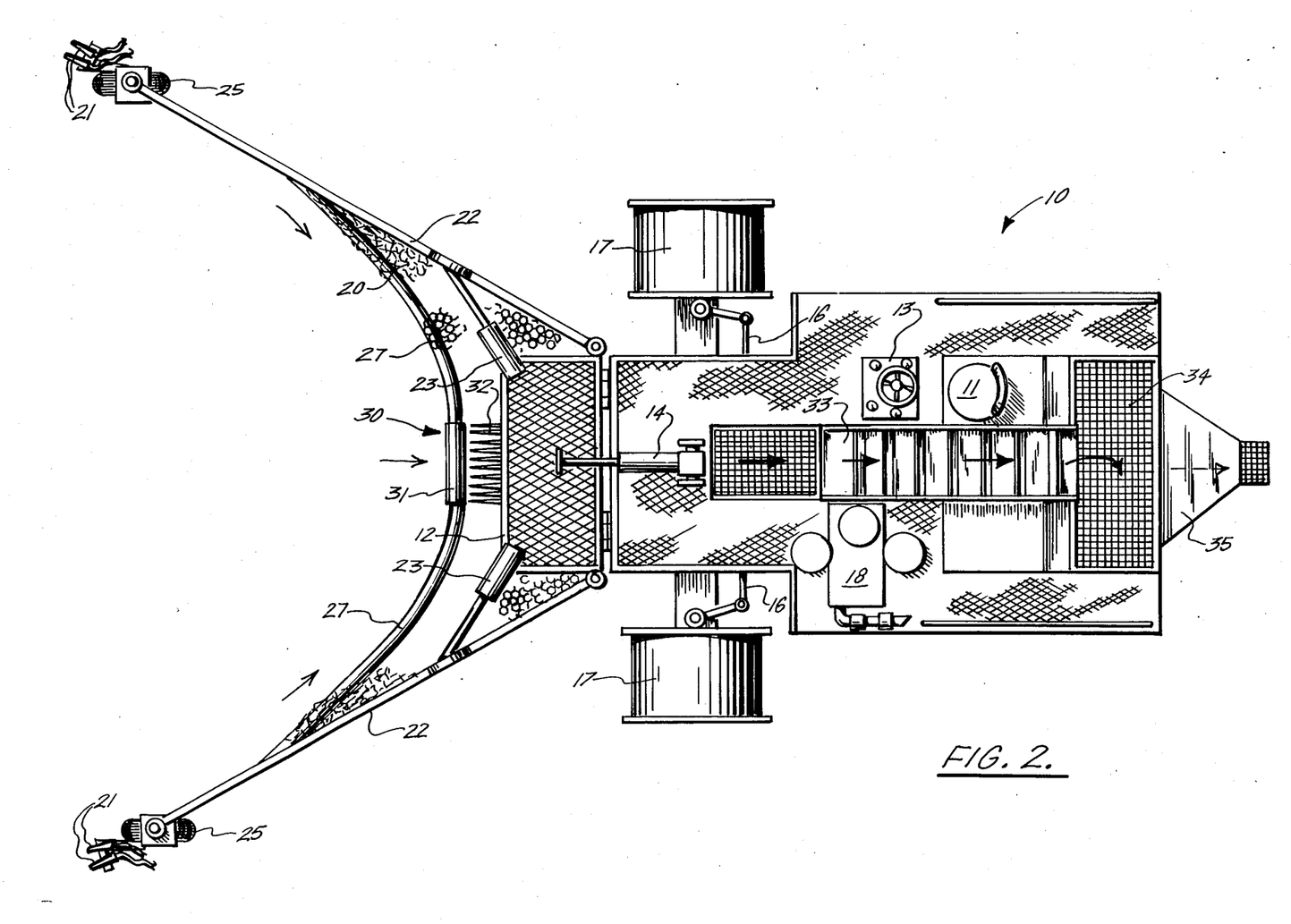
FIG. 2 is a top view of the apparatus of FIG. 1.
Figure 5:
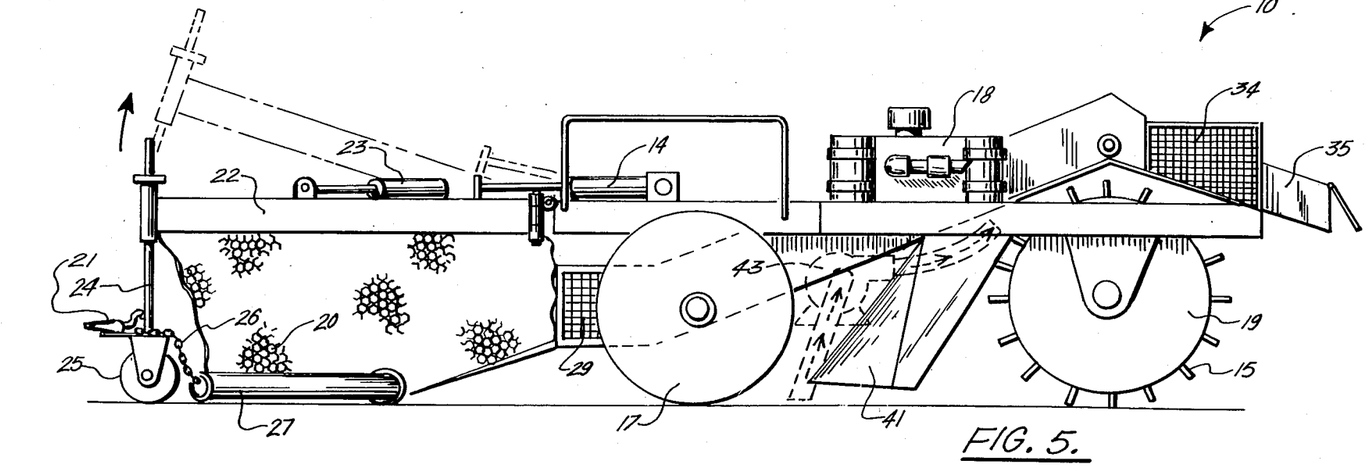
FIG. 5 is a side view of the apparatus of FIG. 1.

As illustrated in FIGS. 1, 2, and 5, vehicle 10 is preferably equipped with large roller or drum-like wheels 17,17 and 19. In the form depicted roller or wheel 19 constitutes the drive wheel for propelling the vehicle and wheels 17,17 can be swiveled for steering by means of steering linkage 16. Preferably wheels 17,17 and 19 all have hollow interiors and are water-tight so as to contribute considerable buoyancy to the overall vehicle when in a flooded field and thereby reduce the extent to which the underlying ground of the flooded field is compacted by the weight of the vehicle. As also illustrated in FIGS. 1 and 5, the exterior of roller or wheel 19 may be equipped with cleats 15 or like means of increasing traction.

Figure 6:
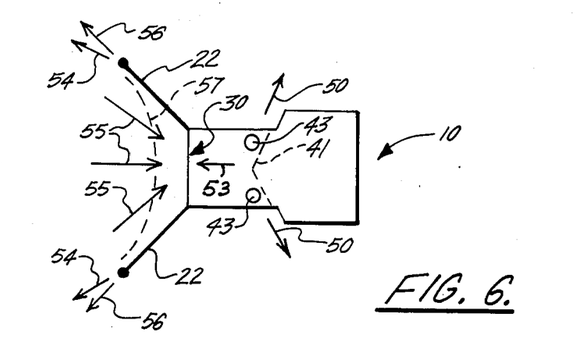
FIG. 6 is a schematic representation of water flows used in preferred embodiments of this invention.

Referring to FIG. 6, it will be seen that by use of means such as water plow 41 or turbine 43, or both, or other appropriate apparatus for driving water from behind open zone 30 and away from the entrance of open zone 30 as indicated for example by arrows 50,50, water is caused to flow toward and into the entrance of open zone 30 as indicated for example by arrows 55,55,55 as vehicle 10 travels forwardly as indicated by arrow 53. The dashed line 57 schematically represents the forwardly advancing zone of turbulence created and maintained in the water out in front of the forwardly traveling vehicle 10. FIG. 6 also illustrates the use of a plurality of outwardly and forwardly directed jets of water in proximity to the ground surface of the flooded field in order to disturb the crawfish thereby tending to cause them to move into the path of the forwardly advancing vehicle 10 and its forwardly moving zone of turbulence 57. These water jets are represented by arrows 54,54 and 56,56 and emanate from positions generally below the outer ends of arms 22,22.

Figure 7A:
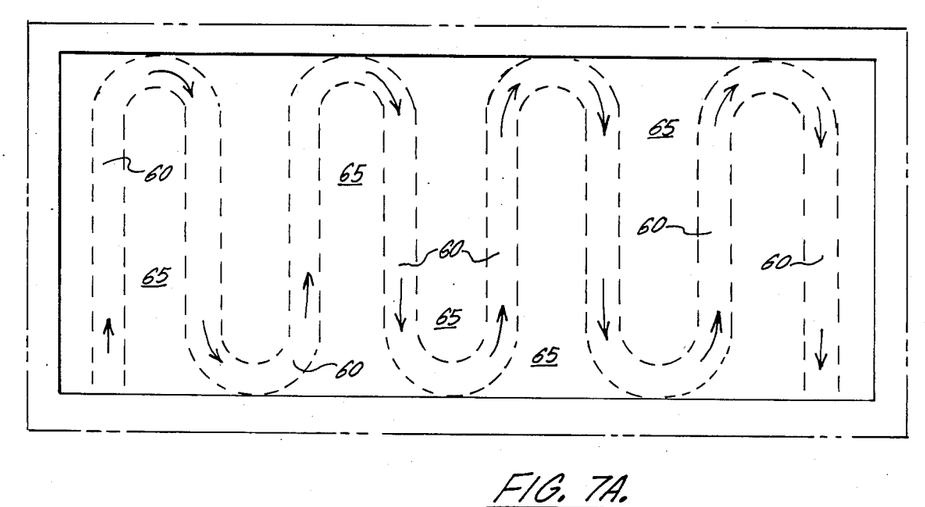
FIGS. 7A and 7B are schematic representations of preferred serpentine harvesting pathways that may be used in the practice of this invention.
Figure 7B:
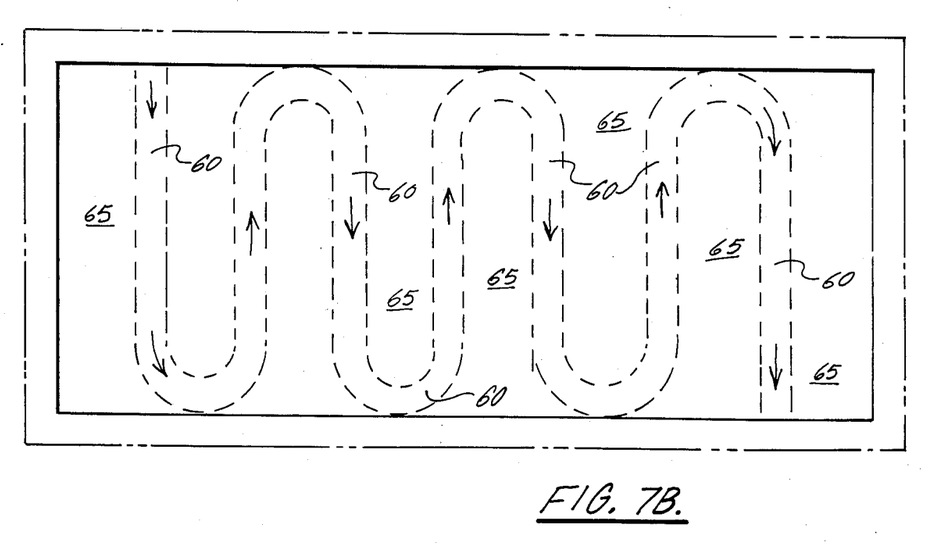

Taken together, FIGS. 7A and 7B schematically indicate one way of harvesting crawfish from a flooded field, such as a large sized flooded rice field. As indicated in FIG. 7A, vehicle 10 is caused to travel in a serpentine path so that the forwardly moving zone of turbulence traces a serpentine path 60. In this way, the crawfish are harvested predominantly from path 60 and not from the adjacent substantially unharvested areas 65. On the next subsequent harvesting occasion, vehicle 10 is operated so that the forwardly moving zone of turbulence traces in the same field a serpentine path 60 which as indicated in FIG. 7B is displaced from the earlier path thereby harvesting crawfish from the previously substantially unharvested areas 65, while not doing much harvesting from the previously harvested path 60. This procedure takes advantage of the fact that under normal conditions crawfish tend to migrate only to a small extent in a flooded field. Therefore, by alternating the paths of harvesting the smaller unharvested crawfish in the harvested path tend to remain there and grow to the desired size even during the next succeeding harvesting operation in which harvesting is concentrated in another path. Also, this procedure allows intervening time for the growth of crawfish to occur—the crawfish population of the field is not excessively harvested in any single operation. And, when one or more turbines 43 or like sprayforming devices are used, the spray of aerated water can be and preferably is caused to fall predominantly on the adjacent area not then being harvested. The aerated water is thus focused in the regions of the field where the crawfish that are not then being harvested are located, and this tends to promote their growth during the interval until the next harvesting operation.

Another way to effectively utilize this invention in harvesting crawfish from a flooded field, such as a large sized flooded rice field, is to periodically and repeatedly cause vehicle 10 to travel in substantially the same serpentine path, such as in FIG. 7A, so that the forwardly moving zone of turbulence traces about the same serpentine path 60 each time. As noted, the aeration of the water sprayed onto areas 65 tends to enhance the growth of the unharvested crawfish concentrated in areas 65. In this procedure, conventional crawfish bait is placed in and along path 60 before the periodic harvesting operations so that many crawfish migrate from areas 65 into path 60 from which they are then harvested. This procedure has the advantage of limiting travel of vehicle 10 to a relatively small portion of the total area of the overall field.

It is thought that the invention and many of its attendant advantages will be understood from the foregoing description and it will be apparent that various changes may be made in the form, construction, and arrangement of the parts without departing from the spirit and scope of this invention, the forms hereinbefore described being merely preferred embodiments thereof. Thus it is not intended that this invention be limited by the description herein presented. Rather, what is intended to be covered is the subject matter set forth in the ensuing claims and the equivalents thereof to which the invention is entitled by law.

What is claimed is:

1. Apparatus for harvesting crawfish or like living objects from relatively shallow water which comprises:
   (a) a vehicle;
   (b) conveyor means aligned in the general direction in which the vehicle travels and adapted to carry the captured living objects from a forward position upwardly to a more elevated rearward position;
   (c) porous means extending laterally from the forward portion of the vehicle for engaging such objects below the water level and directing them toward said forward position of the conveyor means;
   (d) means for thrusting water from behind said forward position to assist in directing such objects below the water level rearwardly toward said forward position of the conveyor means;
   (e) flexible drag means extending laterally from the forward portion of the vehicle, and disposed in front of the vehicle and along the bottom portion of said porous means; and
   (f) substantially continuous hollow tubing having an outer diameter of at least 2 inches encasing a major portion of the length of said drag means so that as the tubing is moved forwardly by the drag means, the tubing creates and maintains an advancing zone of motion in the water in front of the tubing sufficient to lift crawfish or like living objects from the underwater ground surface up into the water for capture, said hollow tubing being flexible in a lateral direction such that said tubing may undulate as needed to remain generally in contact with said ground surface along a substantial portion of its length during said forward movement.

2. Apparatus of claim 1 in which said means of (d) thrust at least a substantial portion of the thrusted water in the form of a spray.

3. Apparatus of claim 1 in which said vehicle is a self-propelled vehicle.

4. Apparatus of claim 1 in which said conveyor means comprises an endless belt conveyor system.

5. Apparatus of claim 1 in which said porous means comprises netting extending laterally from the forward portion of the vehicle.

6. Apparatus of claim 1 in which said porous means comprises netting and a pair of arms each of which is extendible laterally and forwardly from the forward portion of the vehicle for supporting the upper portions of the netting.

7. Apparatus of claim 6 further including supporting means at the respective outer end portions of the arms for supporting the outer ends of the netting and the outer ends of the flexible drag means.

8. Apparatus of claim 7 wherein said drag means comprise one or more drag chains.

9. Apparatus of claim 7 wherein the lower portions of said supporting means ride on wheels.

10. Apparatus of claim 1 in which said means of (d) thrust at least a substantial portion of the thrusted water in the form of sidewardly directed sprays.

11. Apparatus of claim 1 wherein said tubing is oversized so that it loosely encases said flexible drag means.

12. Apparatus of claim 1 wherein the outer diameter of said tubing is about 4 to about 6 inches.

13. Apparatus of claim 1 wherein said tubing has an outer diameter of at least about 4 inches and said drag means and said tubing are adapted to minimize damage to vegetation through and over which said tubing passes.

14. Apparatus for harvesting crawfish or like living objects from relatively shallow water which comprises:
(a) a vehicle;
(b) conveyor means aligned in the general direction in which the vehicle travels and adapted to carry the captured living objects from a forward position upwardly to a more elevated rearward position;
(c) porous means extending laterally from the forward portion of the vehicle for engaging such objects below the water level and directing them toward said forward position of the conveyor means;
(d) flexible drag means extending laterally from the forward portion of the vehicle, and disposed in front of the vehicle and in proximity to the lower portion of the porous means; and
(e) substantially continuous hollow tubing having an outer diameter of at least 2 inches encasing a major portion of the length of said drag means so that as the tubing is moved forwardly by the drag means, the tubing creates and maintains an advancing zone of motion in the water in front of the tubing sufficient to lift crawfish or like living objects from the underwater ground surface up into the water for capture, said hollow tubing being flexible in a lateral direction such that said tubing may undulate as needed to remain generally in contact with said ground surface along a substantial portion of its length during said forward movement.

15. Apparatus of claim 14 in which said vehicle is a self-propelled vehicle.

16. Apparatus of claim 14 in which said conveyor means comprises an endless belt conveyor system.

17. Apparatus of claim 14 in which said porous means comprises netting extending laterally from the forward portion of the vehicle.

18. Apparatus of claim 14 in which said porous means comprises netting and a pair of arms each of which is extendible laterally and forwardly from the forward portion of the vehicle for supporting the upper portions of the netting.

19. Apparatus of claim 18 further including supporting means at the respective outer end portions of the arms for supporting the outer ends of the netting and the outer ends of the flexible drag means, the flexible drag means extending between lower portions of the respective supporting means and forward portions of the vehicle for supporting the lower portions of the netting.

20. Apparatus of claim 19 wherein said flexible drag means comprise one or more drag chains.

21. Apparatus of claim 19 wherein the lower portions of said supporting means ride on wheels.

22. Apparatus of claim 14 wherein said tubing is oversized so that it loosely encases said flexible drag means.

23. Apparatus of claim 14 wherein the outer diameter of said tubing is about 4 to about 6 inches.

24. Apparatus of claim 14 wherein said tubing has an outer diameter of at least about 4 inches and is oversized so that it loosely encases said flexible drag means.

25. Apparatus for harvesting crawfish or like living objects from relatively shallow water in a flooded field which comprises:
(a) a wheeled vehicle;
(b) conveyor means mounted on the vehicle and aligned in the general direction in which the vehicle travels and adapted to carry the captured living objects from a forward position upwardly to a more elevated rearward position;
(c) porous means extending laterally from the forward portion of the vehicle for engaging such objects below the water level and directing them toward said forward position of the conveyor means;
(d) flexible drag means extending laterally from the forward portion of the vehicle, and disposed in front of the vehicle and in proximity to the lower portion of the porous means; and
(e) substantially continuous hollow tubing having an outer diameter of at least about 2 inches encasing a major portion of the length of said drag means so that as the tubing is moved forwardly by the drag means, the tubing creates and maintains an advancing zone of motion in the water in front of the tubing sufficient to lift crawfish or like living objects from the underwater ground surface up into the water for capture, said hollow tubing being flexible in a lateral direction such that said tubing may undulate as needed to remain generally in contact with said ground surface along a substantial portion of its length during said forward movement, the apparatus being further characterized in that the wheels of the vehicle comprise hollow wheels with a large rolling surface area to reduce the amount by which the underlying ground of the flooded field is compacted or rutted by the vehicle during a harvesting operation.

26. Apparatus of claim 25 further including:
(f) means for thrusting water from behind said forward position to assist in directing such objects below the water level rearwardly toward said forward position of the conveyor means.

27. Apparatus of claim 25 in which said porous means comprises netting and a pair of arms each of which is extendible laterally and forwardly from the forward portion of the vehicle for supporting the upper portions of the netting, said apparatus further including supporting means at the respective outer end portions of the arms for supporting the outer ends of the netting and the outer ends of the flexible drag means, the flexible drag means extending between lower portions of the respective supporting means and forward portions of the vehicle for supporting the lower portions of the netting.

28. Apparatus of claim 25 further including means for thrusting water from behind said forward position in the form of sidewardly directed sprays.

29. Apparatus for harvesting crawfish from relatively shallow water which comprises:

(a) a vehicle;
(b) water-permeable means positioned on the front portion of the vehicle for capturing crawfish; and
(c) means for issuing a plurality of underwater water jet streams outwardly and forwardly above the bottom surface of said relatively shallow water from the outer ends of the water-permeable means thereby tending to cause such living objects to move into the path in which the vehicle travels.

30. Apparatus of claim 29 further characterized in that said vehicle is a wheeled vehicle and the wheels of the vehicle comprise hollow drum-like wheels to reduce the amount by which the underlying ground of the flooded field is compacted by the vehicle during a harvesting operation.

31. Apparatus of claim 29 further characterized in that it includes (a) conveyor means aligned in the general direction in which the vehicle travels and adapted to carry the captured living objects from a forward position upwardly to a more elevated rearward position, and (b) means for thrusting water from behind said forward position to assist in directing such objects below the water level rearwardly toward said forward position of the conveyor means.

32. Apparatus of claim 29 further characterized in that it includes means positioned in front of the vehicle for creating turbulence in the water as the vehicle travels forwardly so that such living objects are drawn upwardly in the water for capture.

33. Apparatus of claim 29 furtner characterized in that it includes (a) conveyor means aligned in the general direction in which the vehicle travels and adapted to carry the captured living objects from a forward position upwardly to a more elevated rearward position, (b) means positioned in front of the vehicle for creating turbulence in the water as the vehicle travels forwardly so that such living objects are drawn upwardly in the water for capture, and (c) means for thrusting water from behind said forward position to assist in directing such objects below the water level rearwardly toward said forward position of the conveyor means.

34. Apparatus of claim 33 further characterized in that said vehicle is a wheeled vehicle and the wheels of the vehicle comprise hollow drum-like wheels to reduce the amount by which the underlying ground of the flooded field is compacted by the vehicle during a harvesting operation.

35. A method of harvesting crawfish or like living objects from relatively shallow water which comprises:
(a) causing the objects to be moved in the water toward the mouth of a forwardly moving water-permeable zone;
(b) causing the objects in said zone to be lifted from the water onto rearwardly moving conveyor means; and
(c) forcing water away from behind said zone in the form of sidewardly directed sprays to create a rearward flow of water into the mouth of said zone to assist in directing the objects toward the mouth of said zone.

36. A method of harvesting crawfish or like living objects from relatively shallow water which comprises:
(a) creating a forwardly moving zone of turbulence in the water so that such objects are drawn upwardly in the water;
(b) causing the objects to be drawn toward the mouth of a water-permeable zone from whence they are transported upwardly from the water by a conveyor system; and
(c) forcing water away from behind said zone in the form of sidewardly directed sprays to create a rearward flow of water into the mouth of said zone to assist in directing the objects toward the mouth of said zone.

37. A method of harvesting crawfish or like living objects from relatively shallow water which comprises:
(a) creating a forwardly moving zone of turbulence in the water so that such objects are drawn upwardly in the water;
(b) causing the objects to be drawn toward the mouth of a water-permeable zone from whence they are transported upwardly from the water by a conveyor system; and
(c) forcing water away from behind said zone to create a rearward flow of water into the mouth of said zone to assist in directing the objects toward the mouth of said zone in the form of sidewardly directed sprays;
said method being further characterized by causing said forwardly moving zone of turbulence to follow a serpentine path through the relatively shallow water so that substantial portions of the sprayed water falls on areas in between the serpentine path.

38. A method of harvesting crawfish or like living objects from relatively shallow water which comprises:
(a) creating and maintaining an advancing zone of motion in the water by advancing along the underwater ground surface a substantially continuous tubing having an outer diameter of at least 2 inches to cause the crawfish or like living objects to move upwardly in the water in front of the advancing tubing, said tubing being flexible in a lateral direction such that said tubing may undulate as needed to remain generally in contact with said ground surface along a substantial portion of its length during said advancing of said tubing along said ground surface;
(b) concurrently advancing through the water above said tubing, a water permeable zone having a mouth adapted to capture the upwardly moved living objects; and
(c) forcing water away from behind said zone to create a rearward flow of water into the mouth of said zone to assist in directing the upwardly moved objects toward the mouth of said zone.

39. A method of claim 38 wherein said advancing zone of motion in the water is created and maintained by advancing along the underwater ground surface a flexible tubing having an outer diameter of at least 4 inches.

* * * * *